UNITED STATES PATENT OFFICE.

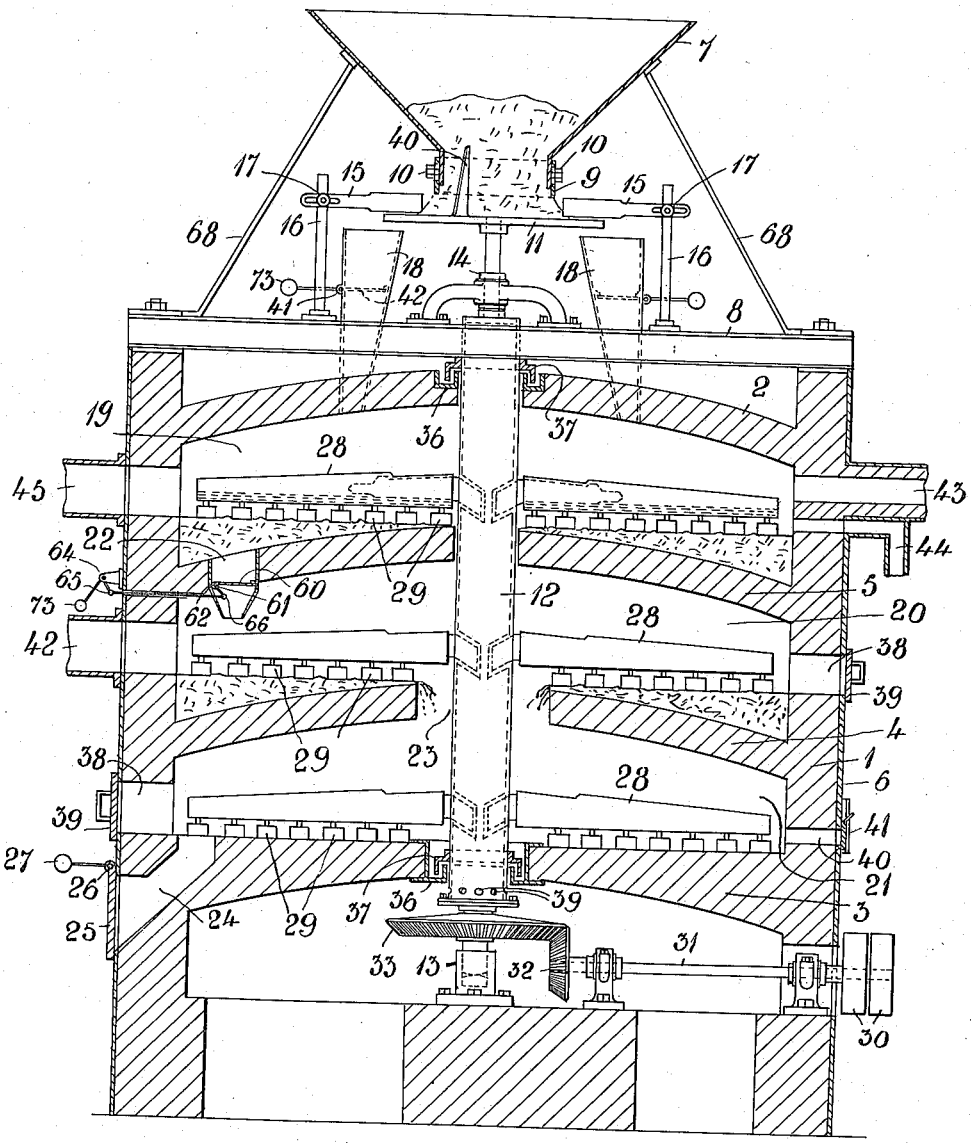

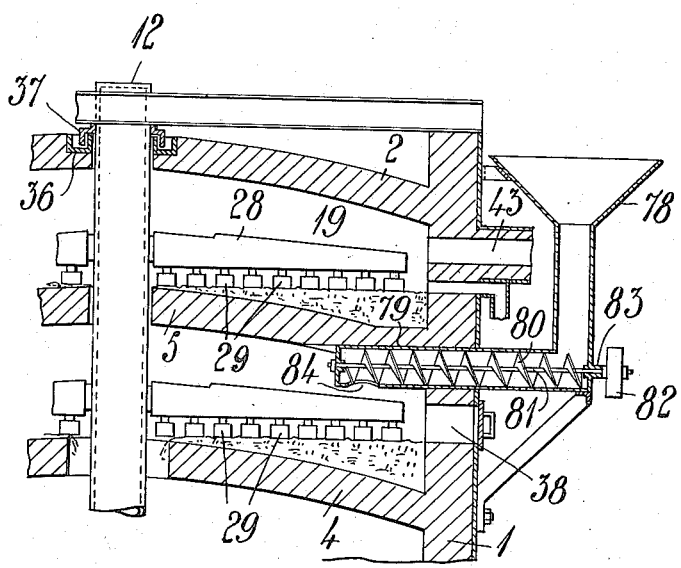

ARTHUR RAMÉN AND KNUT JAKOB BESKOW, OF HELSINGBORG, SWEDEN.

CHLORIDIZING ROASTING OF ORES.

1,129,123. Specification of Letters Patent. Patented Feb. 23, 1915.

Application filed August 18, 1910. Serial No. 577,844.

*To all whom it may concern:*

Be it known that we, ARTHUR RAMÉN and KNUT JAKOB BESKOW, chief engineers, subjects of the King of Sweden, residing in Södra Storgatan 19, Helsingborg, in the Kingdom of Sweden, have invented certain new and useful Improvements in and Relating to the Chloridizing Roasting of Ores, of which the following is a specification.

Roasting ores for the purpose of converting them into chlorids has hitherto been performed either by bringing a mixture of ore and chlorids into direct contact with the smoke or combustion gases in furnaces, or by heating the mixture in muffles, where the smoke gases communicate to the ores the heat necessary for the process indirectly *i. e.* through the walls of the muffles. In the first case there is the disadvantage that the acid gases, generated during the chloridizing process, become diluted or befouled with such large quantities of the combustion gases used for the heating of the material, that it is not possible to fully extract the acids contained in the said mixture of gases, besides which the acid obtained is considerably impure and diluted. This disadvantage is avoided in the latter case by the use of muffle furnaces, but then there is the drawback that the consumption of fuel is very much increased on account of the inferior heating efficiency of the muffles. Attempts have also been made to employ mechanical furnaces for carrying out this process, and among other things it has been proposed first to heat the ore mixed with salt direct with combustion gases in a furnace or section of a furnace, and then cause the ore to descend to another furnace or compartment of a furnace provided with a muffle, in which furnace or compartment the chloridizing takes place with the contribution of heat from the muffle walls. The smoky gases are conducted according to this method first through the muffle compartment and afterward direct into the first compartment, *i. e.* the heating compartment. Arrangements are made to enable the material to descend into the latter compartment, *i. e.* the chloridizing compartment, without the acid gases which are developed in the chloridizing compartment being mixed with the smoky gases in the heating compartment. In this method there is, no doubt, the advantage that the gases can be obtained unmixed from the chloridizing compartment, and moreover a better heat-economizing effect has been obtained than if merely a muffle furnace were employed, as part of the heat is supplied by direct contact with the smoky gases. In employing, however, the supply of heat by means of a muffle encounters in mechanical chloridizing furnaces considerable difficulties. For, in order that the chloridizing process may take place the roasted matter must have a temperature of 400–600° C., and consequently the muffle walls must have a temperature of 700–800° C. At this temperature, however, the mixture of the salt and the ore partially melts, and in consequence the muffle bottom gets caked over. As a consequence of this, the temperature in the muffle must be additionally increased, the consequence of which again is that a still thicker layer forms on the bottom. As a matter of fact, repeated attempts to employ muffle furnaces for chloridizing roasting have broken down owing to mechanical difficulties. In the employment of a muffle there is also the difficulty that over-heating of the material ensues, which causes losses of metal partly owing to the fact that a part of volatile metallic chlorids evaporate and are carried off with the acid gases, or, that some basic metallic chlorids are formed which in the leaching-out process which is afterward to be carried out with the materials do not readily admit of being leached out with water and weak acids. Even if over-heating does not as readily take place in a furnace with mechanical stirring, as in a hand muffle furnace, nevertheless the drawback is so great that it is a factor to be reckoned with.

In contradistinction from the method referred to above, we do not employ any additional heating of material in the chloridizing compartment supplied from without, by means of a muffle, but, instead, we introduce the smoky gases direct from the source of heat into the heating compartment. In this way we are able to bring about a higher degree of heating in the heating compartment, *i. e.* right up to a temperature which is only a trifle lower than that at which chloridizing commences and at which acid gases are introduced. The material, heated in this way to a suitable temperature is brought from the heating furnace (or corresponding compartment or zone of a furnace comprising both a heating furnace and a chloridizing furnace) into the chloridizing furnace or into the corresponding compartment or zone of the said combined heating and chloridizing furnace (said chloridizing furnace or chloridizing compartment or zone being also in the following designated only as "chloridizing furnace") before the acid gases have been developed to any degree worth consideration. Then the chloridizing process under influence of the heat thus applied and the heat developed by the chloridizing process itself takes place in this latter furnace under continuous mechanical stirring of the material and admission of air without it being necessary to supply heat from without. The acid gases developed during the process are led off as before known from the chloridizing furnace separated from the combustion gases led into the heating furnace for heating the material to be treated. By a suitable composition of the mixture of the ore and chlorids and heating of the material in the heating furnace to a suitable temperature, the heat thus given to the material together with the heat developed in the chloridizing furnace by the reaction between the sulfurous metals contained in the ore, the chlorids and the air supplied for the oxidation is sufficient to raise the temperature of all the mixture treated to the temperature at which the chloridizing roasting will begin and continue, i. e. it will not be necessary to supply any combustion gases or any more heat to the ore mixture during the chloridizing process itself. The material usually treated in this way is worked for copper and contains for instance 2–4 per cent. copper and 3–6 per cent. sulfur and for treating the same according to our invention at first there is added chlorid in sufficient quantities, for instance 10–12 per cent. common salt. The mixture of the materials to be roasted and the common salt ground and intimately mixed is then heated in the heating furnace or compartment to about 300 degrees centigrade by direct contact with combustion gases and thereafter said mixture is brought down into the chloridizing furnace or compartment where, owing to the effective mechanical stirring, the temperature is raised to 500–600 degrees centigrade only on account of the heat of reaction of the material and the heat supplied in the heating furnace. Thus it is unnecessary to supply any additional heat to the chloridizing furnace or compartment. It is evident that this method may be carried into effect in many different ways. Thus the whole mixture of ore and chlorid can be heated in the heating zone or the heating furnace to a temperature suitable for the reaction, and then allowed to drop down to the chloridizing zone of the same furnace or may be transported into another furnace serving as the chloridizing furnace, or only a part of the ore may be heated alone, without adding chlorid, and can afterward be brought together with a mixture of the remaining part of the ore and chlorid simultaneously with, or after this mixture being brought into the chloridizing compartment or zone of the combined furnace or into the chloridizing furnace. As, in some cases, it is not necessary for obtaining a temperature suitable for carrying on the reaction to heat the whole mixture of ore the advantage will be gained by performing the process according to the modification last described that a smaller apparatus can be used, and that the loss of heat is smaller and therefore the efficiency greater. It is also possible to heat all the ore to a suitable temperature in the heating furnace (or the heating compartment) and then add chlorid to this heated ore, which is then transported to the chloridizing furnace or chloridizing compartment, where the reaction takes place without it being necessary to supply heat through the muffle. In some cases this latter method is more advantageous or must under certain circumstances be used, while, when heating ores which contain too small a quantity of sulfur the amount of heat necessary cannot suitably be supplied to the material in the heating furnace in the case that the ready mixture of ore and chlorid should be charged into said furnace. If the mixture of chlorid and ore of said kind should be heated in the heating furnace to such a high temperature, which is required for the treating of said ores,—which, by the reaction, do not themselves give off a sufficient amount of heat of reaction—that it should not be necessary to supply further heat in the chloridizing furnace from the outside of the same, reaction between the chlorid and the ore would take place already in the heating furnace and thus acid gases would be lost together with the smoke gases introduced into said furnace for the heating. If instead the ore alone, which sustains a considerable high temperature, is heated in the heating furnace, a sufficient quantity of heat may in that furnace be supplied to the ore without any loss of acid gases, and then, after admixture of chlorid, or a mixture of chlorid and ore, the reaction may be introduced and finished in the chloridizing furnace, without it being necessary to supply further heat to the material in this latter furnace.

By means of this invention it is possible while obtaining pure and concentrated gases, to obtain a small consumption of coal, as all heating of the material takes place by direct contact with smoky gases. By not employing a muffle, all the mechanical difficulties which otherwise ensue owing to the caking of the material on the muffle bottoms, are obviated. Owing to the fact that while the chloridizing process itself is going on, the material is not brought into contact with heated gases or heated wall-surfaces, "muffles", over-heating of the material and the above described loss of metal thereby caused, is obviated.

For carrying out the process of chloridizing described herein, a number of different types of furnaces may be used varying with the nature of the ore.

As already mentioned the heating and the chloridizing can take place in separate furnaces. For this purpose such furnaces may be used which consist of rotating cylinders or immovable furnaces having rotating or reciprocating stirring devices or some other known type of mechanical roasting furnace. It is of course also possible to perform the whole process in one and the same furnace, the heating compartment and the chloridizing compartment being separate from each other as known before, or by means of automatical registers, partitions or other suitable devices, in which case the heated material can be brought down from the heating compartment into the chloridizing compartment in a suitable manner (for instance by means of feeding pistons or feeding screws), so that no quantity of gas worth consideration can pass from one division into the other. Characteristic of the invention is that the latter furnace or compartment is not provided with a muffle and that the smoky or combustion gases are introduced from the source of heat directly into the heating compartment.

In the accompanying drawings a suitable furnace for carrying out the process is shown in Figure 1 in vertical section and Fig. 2 shows in section a part of the same furnace provided with an extra feeding device for introducing material directly into the chloridizing compartment.

1 is the brickwork of the furnace suitably surrounded by a mantle 6 of metal and provided with arches 2 and 3 forming the top and the bottom of the same and also provided with intermediate arches or bottoms 4 and 5 (of any suitable number) by means of which the furnace is divided into several divisions or compartments.

7 is a feeding funnel supported by shores 68 resting on beams 8 supported on the brickwork of the furnace. The lower mouth or outlet opening of said funnel is surrounded by a collar 9, adjustably fastened to the funnel by means of screws 10 in such a way, that the distance between its lower edges and a feeding table 11, arranged under the same can be adjusted as required for regulating the supply of the material.

40 is a pin eccentrically fastened on said table and projecting into the mouth of the funnel in order to prevent stopping of the material.

The feeding table 11 is mounted on the upper end of a centrally located vertical, rotating shaft 12 journaled in bearings 13 and 14. The lower or main part of said shaft may consist of a tube, provided with openings 39 for admitting air to enter into the same for its cooling.

15 are scrapers extending some distance over the periphery of the feeding table 11, and consisting of arms, which at their outer ends are adjustably fastened on standards 16 in such a way, that they by means of screws 17 can be secured in any desired position in order that the inner ends of said arms or scrapers proper may be brought to protrude more or less over the outer edge of the table. Thus, when the table is rotated and material is fed into the funnel 7, a desired quantity of the material (depending on the position of the scrapers) is by said scrapers continuously fed from the rotating table into the channels or tubes 18, that are arranged under the circumference of the table, and through which tubes the material falls down into the upper compartment or division 19 of the furnace. These channels or tubes may be provided with self closing shutters 42, pivotally fastened on bolts 41 and loaded with counterweights 73, which shutters open automatically when a certain quantity of the material, fed into the tubes, has been accumulated upon them but are otherwise closed, through the action of the counterweights, thereby preventing gases from the furnace rising up through them.

In the arch 5 which separates the heating compartment 19 of the furnace from the chloridizing compartment formed by the divisions 20, 21 one or several channel or channels 22 are arranged through which the material heated may pass from the heating compartment down into the chloridizing compartment. In the arch 4 there is also a central opening or channel 23, through which the material can fall down from the division 20 into the division 21, from which latter division the material treated is carried off through a channel (or several channels) 24 in the brickwork, said channel 24 being normally closed by a self closing shutter 25, pivotally hinged on a bolt 26 and provided with a counterweight 27 so arranged, that the shutter by the action of the same is normally closed but opens automatically when a certain quantity of the material has been accumulated in the channel 24 and presses against the shutter.

For stirring and transporting the material through the furnace the following devices are provided: Within each of the several divisions 19, 20, 21 one or several arms 28 removably attached to the rotating shaft 12 extend radially from said shaft. Said arms are provided with scrapers 29 or similar devices extending down into the material resting on the bottoms of the corresponding divisions and stirring the same as the arms 28 rotate with the shaft 12. In order that the material may be transported across the furnace to the outlet channels 22, 23, 24 of the several divisions, said scrapers may consist of blades, which form an oblique angle to the length direction of the arms supporting the same so that when the shaft rotates, the material in the division 19 is transported from the center to the periphery, where it falls down through the channel 22 into the division 20, in which division the scrapers are so arranged that the material is transported from the periphery to the center, where it falls down through the channel 23 into the division 21, in which division the material is again transported in the same way as in division 19 to the periphery, where it is carried off from the furnace through the channel 24. For rotating the shaft 12 any suitable device may be used. In the drawing this device is shown as consisting of belt disks 30, mounted on the one end of a rotating shaft 31, which on its other end is provided with a bevel-wheel 32, which gears with a bevel wheel 33 mounted on the lower end of the shaft 12.

In order to prevent gases in the chloridizing compartment from rising through the channel 22 into the heating compartment, where it otherwise would be mixed with smoke gases and thus freed together with said gases, the following arrangement is provided: In the channel 22 is inserted a funnel shaped tube or sleeve in which is arranged a shutter 60, pivotally hinged on bolts 61 and by means of a projection 66 and a link 62 connected with one end 65 of an angular lever, pivotally hinged on a support 64 projecting from the furnace wall, the other end of said lever being provided with a counterweight, so that the shutter 60 by the action of said counterweight is normally held in closed position but opens as soon as a sufficient quantity of material from the heating compartment has been accumulated upon the same, whereby it discharges said material in the lower funnel shaped part of the sleeve. As the lower mouth of said sleeve is constricted, the material does not at once pass through the same but is stopped there and forms a gas-tight seal at least until the shutter has again had time enough to close itself. By this device gases are prevented from passing between the two compartments although the material to be treated passes from the one compartment into the other. This sealing device may however be substituted for any other device suitable for the purpose.

In order to prevent gases from escaping from the furnace around the shaft 28 at the bottom and the top of the furnace sand-sealings of known construction are provided at those places, consisting of an annular groove or cup 36 fastened to the brickwork and filled with sand or the like and a collar 37 fastened to the shaft the lower edges of which collar enter into the sand in the corresponding groove 36, thus forming a gas-tight seal. 38 are openings in the wall closed by removable shutters 39, through which openings access to the interior of the furnace is provided for carrying out any work or repairing that is required. 40 is an opening for admitting air into the chloridizing department. The area of said opening may be regulated by means of an adjustable damper 41 in order to control the supply of air. 42 is an outlet for the chlorin gases developed in the chloridizing department. 43 is an inlet for generator gases (or other gases) used for heating the material in the heating department and 44 is a pipe through which the air necessary for combustion of said gases is introduced. 45 is an outlet for the gases, used for heating the material. This furnace (which is shown only as an example) works in the following manner: The material to be treated consisting of a mixture of ore, for instance roasted (oxidized) pyrites, and chlorids, for instance common salt, is charged into the funnel 7, and from thence it is by means of the rotating feeding table 11 and the scrapers 15 fed in a continuous stream, as above described, down into the heating compartment 19 through the tubes 18. Generator gas is also introduced into said heating compartment through the pipe 43, and is there burned by air introduced through the pipe 44, whereby the material is heated to any desired temperature (which temperature can be regulated by regulating the supply of said gases). At the same time the material is continuously stirred by means of the scrapers 29 and transported to the channel (or channels) 22 through which the material descends into the chloridizing compartment, where the chloridizing process proper takes place without any further supply of heat during a continuous stirring of the material and transporting of the same from the one division into the other as above described and finally to the channel 24 through which the treated material is carried off, while the gases developed in the chloridizing compartment are carried off through the pipe 42 to a condenser. If found necessary a further amount of chlorid or ore or a mixture of chlorid and ore may also be directly supplied to the chloridizing compartment as above stated for instance by means of a feeding screw or the like as shown in Fig. 2. In this figure 78 is a funnel or hopper communicating with the one end of a feeding pipe 79, the other end of which communicates with the chloridizing compartment 20 of the furnace through the opening 84. In said pipe 79 a rotatable feeding screw 80 is arranged. On the outer end of the shaft 81 of said screw, which shaft is journaled in a bearing 83, is fastened a pulley 82 by means of which the screw may be rotated in known manner, so that chlorids or other materials charged in the hopper 78 may by means of said feeding screws in known manner be brought into the chloridizing compartment 20.

In the furnace shown on the drawing the heating compartment is shown to consist only of one stage or division, while the chloridizing compartment comprises two stages or divisions. It is however to be understood that each compartment may comprise any suitable number of stages or divisions communicating with each other in the manner above elucidated.

In the process above described a complete separation of the acid gases generated in the chloridizing compartment and the gases used for heating the material in the heating compartment takes place, which separation is effected by the use of such a seal or tightening device between the said compartments, that material to be treated may pass from the heating compartment into the chloridizing compartment while at the same time gases are prevented from passing from the one compartment into the other. When, however, such materials are to be treated, which, when mixed with chlorids, easily become cloddy it may happen, that said devices do not act satisfactorily, but instead the passage between the two compartments gets stopped. In order to get rid of these disadvantages the said sealing devices may be left out which can be done without any considerable mixing of the gases from the heating compartment and the chloridizing compartment is caused if the process is thus carried out that the gases in the heating compartment are given a somewhat higher pressure than the gases in the chloridizing compartment. By this manner of working the valuable acid gases developed in the chloridizing compartment are fully prevented from entering into the heating compartment and the main part of the combustion gases in this latter compartment can easily be led off for instance to the chimney, while the gases in the chloridizing compartment are led to a condenser. No gastight sealing being provided in the channel through which the heating compartment and the chloridizing compartment communicate with each other, obviously, on account of the higher pressure in the heating compartment some combustion gases will enter from that compartment into the chloridizing compartment, but, if the difference in pressure of the gases in the two compartments is suitably regulated the quantity of combustion gases, which enter into the chloridizing compartment is so small that no disadvantageous dilution or vitiation worth mentioning of the gases in the last named compartment is caused. For the rest, in some cases it may be advantageous to supply some heat to the material in the chloridizing compartment, for which purpose it is well to introduce some combustion gases into said compartment. The principal object is, however, that all or at least the main part of the combustion gases which in the heating compartment directly act on the material to be treated may be directly led off from that compartment without causing any loss of the acid gases in the chloridizing compartment.

For carrying out this modified form of the process in question, among other furnaces, a usual roasting furnace of the so called "Mac' Dougall's type" may be used, i. e. a standing cylindrical furnace with a central vertical shaft and several annular bottoms arranged one above the other, on which bottoms the ore is transported from the one bottom to the other by means of stirring devices extending from and connected with the vertical shaft. If a furnace is used provided with for instance five bottoms, the heating gases or smoke gases used for the heating of the material may be introduced in the space between the first and second bottom from the top and led off from the space or division formed above the first bottom from the top. These two spaces or divisions in this case form together the heating zone. The gases generated by the chloridizing process may in this case be carried off from the divsion formed under the second or third bottom from the top. Thus in this case the chloridizing compartment is formed by the three lower divisions of the furnace. The said difference in pressure can for instance be obtained by having the two compartments work under different vacuum (draft) or by having the heating compartment work under overpressure and the chloridizing compartment work under vacuum (draft) or finally in such a way that overpressure is present in both compartments, but is higher in the heating compartment. The expression overpressure as above used, refers to the atmospheric pressure.

In all cases the gases in the heating compartment are kept at a somewhat higher absolute pressure than the gases in the chloridizing compartment. In case overpressure is kept in the heating compartment this overpressure may be caused by having the air necessary for the combustion introduced under pressure into the heating compartment by mechanical means, and in case gaseous fuel is used also the combustible gas is introduced under pressure. In case overpressure is used also in the chloridizing compartment and the gases are to be led off from that compartment under pressure, the air necessary for the chloridizing process which air causes the formation of the acid gases ($C_1$, $SO_2$ and $SO_3$) is introduced under overpressure in the said compartment.

In the following claims the words furnace member are used for the designation of a separate furnace as well as a special compartment or zone of a furnace comprising both a heating compartment and a chloridizing compartment.

Having thus described our invention, we declare, that what we claim is:—

1. The herein described process for chloridizing roasting of ore and the like, which consists of heating the material to be treated in a furnace member by direct action of hot gases introduced into said furnace member, subjecting the heated material to the action of a chloridizing agent in a second furnace member, and allowing the chloridizing process to take place in the second furnace member under continuous mechanical stirring and under the influence of the previously applied heat and the heat developed by the chloridizing process itself, without additional supply of heat from an external source, and drawing off the gases developed in the last-mentioned furnace member during the chloridizing process separate from the heating gases introduced into the first named furnace member.

2. The herein described process for chloridizing roasting of ore and the like, which consists in heating the material to be treated in a furnace member by direct action of hot gases introduced into said furnace member, subjecting the heated material to the action of a chloridizing agent in a second furnace member, and allowing the chloridizing process to take place in the second furnace member under continuous mechanical stirring and under the influence of the previously applied heat and the heat developed by the chloridizing process itself, without additional supply of heat from an external source, and drawing off the gases developed in the last-mentioned furnace member during the chloridizing process separate from the heating gases introduced into the first-named furnace member, the gases in the first named furnace member being kept at a higher pressure than the gases in the other furnace member.

3. The herein described process for chloridizing roasting of ore and the like, which consists in heating a mixture of the material to be treated and the chloridizing agent in a furnace member by direct action of hot gases introduced into said furnace member, transferring the heated mixture to a second furnace member and allowing the chloridizing process to take place in the second furnace member under continuous mechanical stirring and under the influence of the previously applied heat and the heat developed by the chloridizing process itself, without additional supply of heat from an external source, and drawing off the gases developed in the last-mentioned furnace member during the chloridizing process separate from the heating gases introduced into the first-named furnace member.

4. The herein described process for chloridizing roasting of ore and the like, which consists in heating a mixture of the material to be treated and the chloridizing agent in a furnace member by direct action of hot gases introduced into said furnace member, transferring the heated mixture to a second furnace member, adding a quantity of one of the ingredients thereof and allowing the chloridizing process to take place in the second furnace member under continuous mechanical stirring and under the influence of the previously applied heat and the heat developed by the chloridizing process itself, without additional supply of heat from an external source, and drawing off the gases developed in the last mentioned furnace member during the chloridizing process separate from the heating gases introduced into the first-named furnace member.

5. The herein described process for chloridizing roasting of ore and the like, which consists in heating a mixture of the material to be treated and the chloridizing agent in a furnace member by direct action of hot gases introduced into said furnace member, transferring the heated mixture to a second furnace member, adding a quantity of the chloridizing agent, and allowing the chloridizing process to take place in the second furnace member under continuous mechanical stirring and under the influence of the previously applied heat and the heat developed by the chloridizing process itself, without additional supply of heat from an external source, and drawing off the gases developed in the last mentioned furnace member during the chloridizing process separate from the heating gases introduced into the first-named furnace member.

6. The herein described process for chloridizing roasting of ore and the like, which consists of heating the material to be treated in a furnace member by direct action of hot gases introduced into said furnace member, transferring the heated material to a second furnace member, adding a chloridizing agent and allowing the chloridizing process to take place in the second furnace member under continuous mechanical stirring and under the influence of the previously applied heat and the heat developed by the chloridizing process itself, without additional supply of heat from an external source, and drawing off the gases developed in the last mentioned furnace member during the chloridizing process separate from the heating gases introduced into the first-named furnace member.

7. In the chloridizing of ores by heating such ores by fire heat in one chamber and by finishing and chloridizing in another and adjacent communicating chamber the process which comprises maintaining said first fire-heated chamber under greater pressure than the second communicating chloridizing chamber.

In witness whereof we have hereunto set our hands in presence of two witnesses.

ARTHUR RAMÉN.
KNUT JAKOB BESKOW.

Witnesses:
 EWA VON ESSEN,
 M. KJCUSTROUS.